May 22, 1962  B. E. A. H. BEESKOW  3,035,666
BRAKE INSTALLATION
Filed Sept. 29, 1958
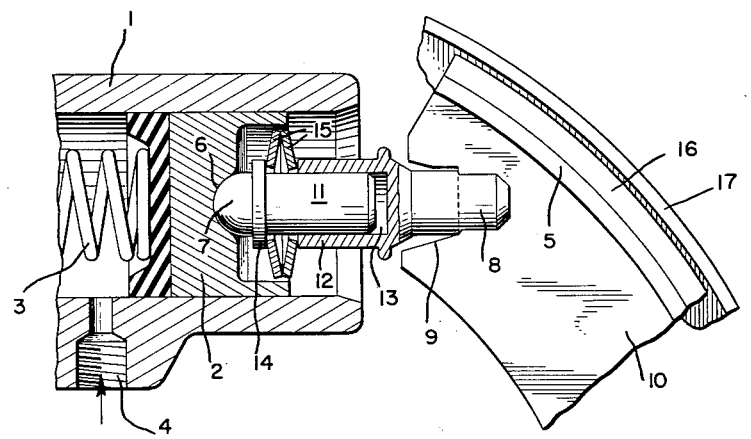
INVENTOR.
BRUNO E. A. H. BEESKOW
BY Dicke and Craig
ATTORNEYS ns # United States Patent Office 3,035,666
Patented May 22, 1962

3,035,666
BRAKE INSTALLATION
Bruno E. A. H. Beeskow, Stuttgart-Bad Cannstatt, Germany, assignor to Daimler-Benz Aktiengesellschaft, Stuttgart-Unterturkheim, Germany
Filed Sept. 29, 1958, Ser. No. 764,107
Claims priority, application Germany Oct. 10, 1957
8 Claims. (Cl. 188—217)

The present invention relates to a brake shoe actuating mechanism particularly for motor vehicles in which the plunger member between the brake shoe and the actuating piston is so constructed as to minimize the effects on the vehicle caused by out-of-round conditions of the brake drum.

With brake shoes effective within a brake drum, it happens oftentimes that the drum becomes out of round by reason of the heating which occurs during braking. The result of such out-of-round condition of the brake drum is an uneven transmission of the braking torque to the respective vehicle axle which is thereby excited or set into rapid swinging movements which again, in turn, shake the vehicle body into swinging movements which are both audible and are readily noticeable by the vehicle passengers as unpleasant and disagreeable.

The present invention obviates this disadvantage and consists essentially in the arrangement of springy plunger members between the pressure pistons of the brake cylinder and the brake shoes which absorb the shocks caused by the out-of-round condition of the brake drum. These shocks are thereby no longer transmitted to the brake system and the swinging movements mentioned hereinabove which appear as a result thereof no longer occur in an arrangement in accordance with the present invention.

A further advantage of the present invention consists therein that the entire plunger spring arrangement, and more particularly, a cut-spring arrangement is displaced toward the outside of the pressure piston of the brake. For that purpose, the springy pressure plunger member is constructed as a telescopic plunger member, the two parts of which are spread apart normally by the cup springs. The use of such a plunger member enables the obtainment of a smaller spring path for the high-pressure forces which occur and the plunger member which need not be constructed of greater length than in a normal non-springy plunger member may be subsequently installed in any shoe brake system operating with a plunger member.

Accordingly, it is an object of the present invention to provide a shoe brake actuating mechanism which obviates the shortcomings of the prior art and which, in particular, prevents the production of vibrations and swinging movements caused by out-of-round conditions of the brake drums.

It is another object of the present invention to provide a brake shoe actuating plunger member which absorbs the shocks and vibrations caused by the out-of-round conditions of the brake drums by the use of a resilient structure, preferably utilizing a relatively strong spring or springs of sufficient strength to transmit the highest brake actuating force which may occur in the system.

A still further object of the present invention resides in the provision of a two-part plunger member for transmitting the actuating force from the piston of the brake cylinder to the brake shoe which is simple and sturdy in construction and satisfies all operational requirements of the brake system.

A further object of the present invention resides in the provision of a resilient plunger member for hydraulically actuated shoe brake systems which may be readily installed, not only into new brake systems but also into existing shoe brake systems which utilize a plunger member made of a single part.

These and other objects, features and advantages of the present invention will become more obvious from the following description when taken in connection with the accompanying drawing which shows, the single FIGURE thereof, one preferred embodiment of a shoe brake actuating mechanism in accordance with the present invention.

Referring now to the drawing which illustrates a partial cross sectional view through the brake actuating mechansim in accordance with the present invention, reference numeral 1 designates therein a brake cylinder of conventional construction. The pressure piston 2 which reciprocates within the cylinder 1 is under the influence of a spring 3 normally spreading the piston. A fluid medium under pressure such as brake fluid is supplied through inlet line 4 and acts on the piston 2 to displace the same outwardly when fluid under pressure is supplied. A suitable gasket of any appropriate material, as is conventional, is also used on the inside of the piston 2 to prevent any brake fluid from escaping around the piston 2.

The brake shoe which is actuated by the pressure piston 2 is designated in the drawing by reference numeral 5. The outer side or exposed side of the pressure piston 2 is provided with a ball-shaped socket 6 against which is pivotally supported the ball-shaped end 7 of a plunger member inserted between the piston 2 and the brake shoe 5. The other end of the plunger member is operatively connected with the fork-shaped portion 8 thereof with the brake shoe 5 within the region of a notch 9 provided at the end face thereof by means of the web or leg portion 10 of the T or angle-shaped brake shoe 5. The aforementioned arrangement utilizing a one-piece plunger member is known in the prior art and forms no part of the present invention.

According to the present invention, the plunger member is subdivided into a pin member 11 and a cylinder member 12. The pin member 11 slides in a gas-tight manner within cylinder 12 while leaving an air cushion 13 therein. Furthermore, the pin member is provided adjacent the ball-shaped end thereof with a collar 14. Two closed disk shaped bodies which complement one another into cup springs 15 are arranged between the collar 14 and the left end of the cylinder member 12 as seen in the drawing.

Operation

The operation of the actuating mechanism in accordance with the present invention which may be readily ascertained from the drawing is as follows:

As soon as a pressure medium is supplied to the cylinder space of the cylinder 1 through line 4, the piston 2 is displaced outwardly and brings the brake lining 16 of the brake shoe into abutment against the brake drum 17. The cup spring 15 is selected of such strength that it is able to transmit the highest brake pressure with safety. As soon as the brake drum 17 becomes out of round under the influence of the frictional heat which occurs, this out-of-round condition causes the brake shoes to be placed into swinging movements which, however, are absorbed reliably by the cup springs 15. The air cushion 13 thereby also exerts a certain damping effect so that the cup springs 15 themselves are already subjected to shocks of a more soft nature. Moreover, the friction work of the pin member 11 in cylinder member 12 opposes the production of undesired swinging movements. Consequently, the shocks caused or emanating from the out-of-round condition of the brake drum are no longer transmitted in an annoying manner to the brake system in the actuating mechanism according to the present invention.

While I have shown and described one embodiment in accordance with the present invention, it is understood that the same is not limited thereto but is susceptible of many changes and modifications within the spirit and scope of the present invention. For example, any suitable plunger member having the necessary absorbing characteristics may be used. Likewise, the absorbing means may be in the form of any suitable spring or springs.

Thus, it is seen that the present invention is susceptible of many changes and modifications within the spirit and scope of the invention thereof and I, therefore, do not wish to be limited to the specific embodiment illustrated herein, but intend to cover all such modifications and changes as encompassed by the appended claims.

I claim:

1. An arrangement for equalizing the effect of the out-of-round condition of brake shoes, particularly for motor vehicles, comprising brake shoe means, actuating means including a pressure cylinder and a pressure piston reciprocating therein, and means operatively connected between said pressure piston and said brake shoes means and including auxiliary cylinder-plunger means for transmitting the movements of said pressure piston to said brake shoe means, said cylinder-plunger means being composed of a telescopic cylinder member in operative engagement with said brake shoe means, a plunger pin member slidably arranged within said cylinder member, and spring means between said two members, said plunger pin member having a ball-shaped end portion in operative engagement with a ball-shaped socket portion in said pressure piston to pivotally support the former in the latter.

2. An arrangement according to claim 1 wherein said plunger pin member is provided with collar means adjacent said ball-shaped end, said spring means being interposed between said collar means and the end of said telescopic cylinder member.

3. An arrangement according to claim 2 wherein an air cushion is enclosed within said telescopic cylinder member between the same and said plunger pin member.

4. An arrangement according to claim 3 wherein said spring means are cup-shaped springs.

5. A brake equalizing arrangement particularly for motor vehicles, comprising brake shoe means, actuating means including a pressure cylinder and a pressure piston reciprocating therein, means operatively connecting said pressure piston and said brake shoe means including auxiliary cylinder means, plunger means provided with collar means telescopically arranged within said cylinder means, and spring means arranged between said auxiliary cylinder means and said plunger means including at least two cup-shaped annular spring disks abutting against each other at the outer periphery thereof, one of said spring disks being supported on said collar means, the other one of said spring disks being supported on said auxiliary cylinder means, said plunger means having a ball-shaped end portion in operative engagement with a ball-shaped socket portion provided in said pressure piston to pivotally support the former in the latter, the other end portion of said plunger means and said auxiliary cylinder means effectively constituting together an air cushion therebetween.

6. An arrangement for equalizing the effect of the out-of-round condition of brake shoes, particularly for motor vehicles, comprising brake shoe means, actuating means including a pressure cylinder and a pressure piston reciprocating therein, and means operatively connected between said pressure piston and said brake shoe means and including auxiliary spring means for transmitting the movements of said pressure piston to said brake shoe means, said auxiliary spring means being composed of a cylinder member and a plunger pin member having an end portion telescopically and slidably arranged within said cylinder member, one of said members being in operative engagement with said brake shoe means, and spring means between said two members, the other of said members having an end portion in operative engagement with and pivotally secured to said pressure piston to support the former by the latter, the end portion of said plunger pin member extending within said cylinder member and said cylinder member effectively constituting together an air cushion therebetween.

7. An arrangement according to claim 6, wherein said spring means between said two members are cup-shaped springs arranged on the outside of said plunger pin member.

8. An arrangement according to claim 6, wherein said plunger pin member is provided with collar means, and wherein said spring means includes at least two cup-shaped annular spring disks abutting against each other at the outer periphery thereof, one of said spring disks being supported on said collar means and the other one of said spring disks being supported on said auxiliary cylinder means, said collar means and the end of said cylinder member.

References Cited in the file of this patent

UNITED STATES PATENTS

| | | |
|---|---|---|
| 1,648,864 | Pugh | Nov. 8, 1927 |
| 2,100,488 | Rasmussen | Nov. 30, 1937 |
| 2,257,628 | Wahlberg | Sept. 30, 1941 |
| 2,329,095 | White | Sept. 7, 1943 |
| 2,224,215 | Chartock et al. | Dec. 10, 1948 |
| 2,966,238 | Lauer et al. | Dec. 27, 1960 |